United States Patent [19]

Felice, Jr. et al.

[11] 4,265,871
[45] May 5, 1981

[54] PURIFICATION OF BORON-CONTAINING SULFURIC ACID

[75] Inventors: Charles J. Felice, Jr., Randolph Township, Morris County, N.J.; Francis E. Evans, Hamburg, N.Y.; Martin A. Robinson, East Amherst, N.Y.; Richard E. Eibeck, Orchard Park, N.Y.

[73] Assignee: Allied Chemical Corporation, Morris Township, Morris County, N.J.

[21] Appl. No.: 36,464

[22] Filed: May 7, 1979

[51] Int. Cl.³ .............. C01B 17/90; C01B 35/06; C01B 9/08; C01B 7/00
[52] U.S. Cl. .................. 423/531; 423/240; 423/293; 423/489
[58] Field of Search .......... 423/522, 531, 293, 489, 423/240

[56] References Cited

U.S. PATENT DOCUMENTS

| | | | |
|---|---|---|---|
| 2,381,027 | 8/1945 | Baldeschwieler et al. | 423/293 |
| 2,416,133 | 2/1947 | Young et al. | 423/293 |
| 2,697,027 | 12/1954 | Swinehart et al. | 423/293 |

FOREIGN PATENT DOCUMENTS

| | | | |
|---|---|---|---|
| 522875 | 3/1956 | Canada | 423/293 |
| 2027389 | 12/1971 | Fed. Rep. of Germany | 423/293 |
| 1216065 | 12/1970 | United Kingdom | 423/293 |

*Primary Examiner*—Herbert T. Carter
*Assistant Examiner*—Gary P. Straub
*Attorney, Agent, or Firm*—Alan M. Doernberg; Jay P. Friedenson

[57] ABSTRACT

Sulfuric acid contaminated with boron and fluoride values such as the waste acid of a boron trifluoride process is purified by contacting the contaminated acid with an inert gas to desorb boron trifluoride, and the inert gas is stripped by contacting with an absorbing liquid including concentrated sulfuric acid. Fluosulfonic acid is added to contaminated sulfuric acid at levels approximately three times the molar values of boric acid contaminant as an agent to spring nonvolatile boron values. The absorption of boron trifluoride into the absorbing sulfuric acid is improved when it contains boric acid. Preferably the contaminated sulfuric acid to be purified is one portion of the waste liquid and the absorbing liquid is another portion of the waste liquid of a boron trifluoride manufacturing process. Boric acid is added to the absorbing liquid, then boron trifluoride is stripped from the inert gas and absorbed into the absorbing liquid. The absorbing liquid along with stripped boron trifluoride is recycled to a boron trifluoride manufacturing process. The inert gas can be recycled to the desorbing step.

12 Claims, 1 Drawing Figure

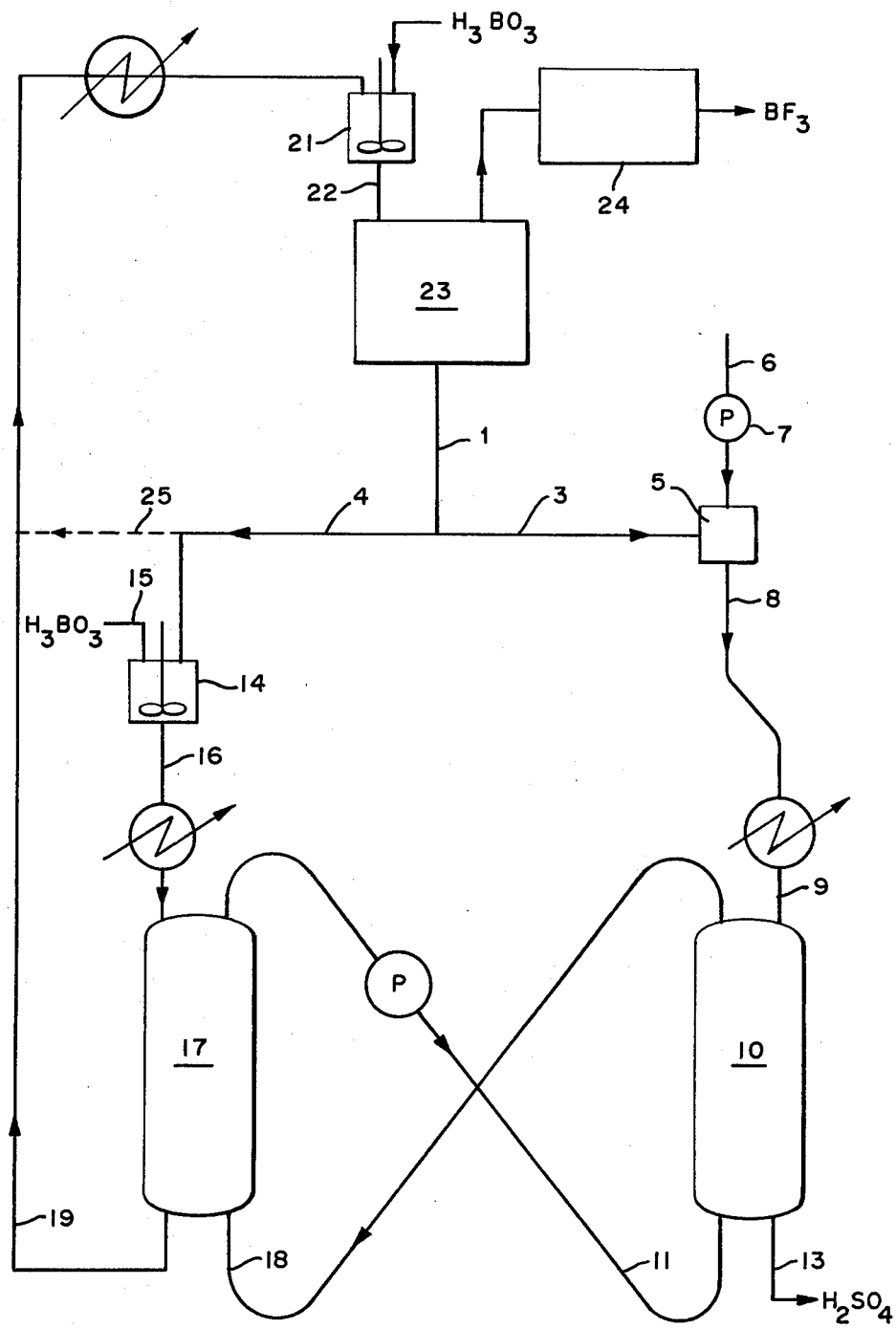

PURIFICATION OF BORON-CONTAINING SULFURIC ACID

BACKGROUND OF THE INVENTION

The present invention relates to removing boron and fluoride values from contaminated sulfuric acid streams and especially to purifying the waste and acid of a process wherein boron trifuloride is formed by the reaction of fluosulfonic acid (or hydrogen fluoride and sulfur trioxide separately) with boric acid.

Boron trifluoride is commercially produced for catalytic and other applications by the reaction of hydrogen fluoride or fluorsulfonic acid with boric acid. Often these reagents are introduced as boric acid dissolved in sulfuric acid and fluosulfonic acid formed from hydrogen fluoride and suflur trioxide. A normal by-product of the process is sulfuric acid. This by-product acid is generally unsuitable for most applications because of boron, and to a lesser extent fluoride contamination. The boron contamination is typically in the form of boric acid, boron trifluoride and intermediates therebetween such as $H_2BO_2F$ and $HBOF_2$.

Among the suggestions for purifying this contaminated sulforic acid is a process described in U.K. Pat. No. 1,216,065 (Dec. 16, 1970) of passing nitrogen through the acid or contacting the acid in a washing tower with air in counter flow at elevated temperatures with absorption of the expelled boron trifluoride in water and formation of oxyfluoboric acid. Such a process is capable of recovering only that portion of the boron present as boron trifluoride and, furthermore, recovers the boron trifluoride in a form unsuitable for conversion back to boron trifluoride. The resultant aqueous solution of oxyfluoboric acid would represent a disposal problem rather than a valuable comodity. Substantially complete removal of boron trifluoride from inert gases (such as air) containing boron trifluoride is not easily achieved with water as the absorbing liquid, with the gas outflow thereby having a fog of boron trfluoride in the form of a hydrate or other, unknown species, representing a serious pollution problem.

BRIEF DESCRIPTION OF THE INVENTION

The present invention is an improvement in a process in which sulfuric acid contaminated with boron values is purified by contacting the contaminated sulfuric acid with an inert gas to remove boron trifluoride and then contacting the inert gas containing boron trifluoride with an absorbing liquid to strip the boron trifluoride from the inert gas. In the improvement, fluosulfonic acid or hydrogen fluoride is added to the contaminated sulfuric acid prior to contacting the contaminated sulfuric acid with the inert gas. Preferably the absorbing liquid comprises sulfuric acid having a concentration of at least about 95% and boric acid; more preferably, the absorbing liquid comprises between about 5 and about 30 weight percent boric acid in at least about 98% sulfuric acid.

The present invention also includes a process of removing boron trifluoride from a gaseous stream contaminated with boron trifluoride which comprises contacting the gaseous stream with an absorbing liquid of sulfuric acid of at least about 95% concentration in which is dissolved boric acid.

DETAILED DESCRIPTION OF THE INVENTION

The present invention relates in part to a two step process of recovering boron (and fluoride) values from a contaminated sulfuric acid stream in usable form. In general, these two steps can be considered separately.

In the first step contaminated sulfuric acid containing boron, such as the waste acid stream of a boron trifluoride manufacturing process, is purified. Although the exact concentration of this stream is not critical to the present invention, this acid is generally of a concentration of at least about 90%, preferably at least about 95% and more preferably between 98 and 101% sulfuric acid, measured by total acid. Briefly, this standard measurement of sulfuric acid concentration is determined by titrating the contaminated acid with standard base such as one molar sodium hydroxide to a pH of 7 and expressing the moles of base consumed by the contaminated acid as a percentage of the moles of base consumed by an equivalent weight of 100% sulfuric acid. This value is taken directly for acid with only minor amounts of boric acid, as below about 0.5%.

The boron contamination may take the form of boric acid, boron trifluoride and intermediates therebetween such as $H_2BO_2F$ and $HBOF_2$. It may also take other forms as $BF_3 \cdot H_2O$, $HBF_4$ and $BF_3 \cdot H_3BO_3$. Fluoride may be, but is not necessarily, present in the contaminated sulfuric acid stream as well. Other contaminants may also be present, as for example are contributed by the various raw materials of a boron trifluoride manufacturing process (sulfur trioxide, hydrogen fluoride, boric acid and/or boron trioxide). Representative contaminants include other halides ($Cl^{31}$ and $Br^{31}$), heavy metals, nitrate and other anions and iron. The contaminants have no adverse effect upon the purification of the contaminated sulfuric acid stream with regard to boron and, if present, fluoride by the present process. Representative waste streams from a boron trifluoride process include 0.05 to 0.5 percent total boron, 0.5 to 3 percent total fluoride, 95 to 100 percent sulfuric acid as $H_2SO_4$, 0 to 2 percent boric acid, 0.2 to 2 percent boron trifluoride, 0.1 to 10 ppm chloride, 1 to 1000 ppm chlorine, 1 to 500 ppm heavy metals, 1 to 100 ppm nitrate and 10 to 1000 ppm iron, all by weight. The waste stream may also contain very minor proportions of organics.

The inert gas contacting the contaminated sulfuric acid stream may be nitrogen, air or a noble gas, for example. Preferably, because of ready availability, the inert gas is dry nitrogen or air. Preferably the inert gas contains less than 200 ppm of moisture. If $SO_3$ or $HSO_3F$ are present in excess in the contaminated liquid stream, then more moisture can be tolerated. Contacting of the inert gas and contaminated sulfuric acid may be conducted at atmospheric pressure, somewhat above atmospheric pressure (such as about 900 millimeters of mercury absolute or 120 kPa), or at any vacuum conditions below atmosperic pressure that are conventiently obtained. Preferably this step is conducted at between about 30 and 800 millimeters of mercury absolute pressure (about 4 to about 107 kPa). The temperature of this step is also not critical by itself, with temperatures as low as 20° C. or somewhat below up to about 250° C. being contemplated with the upper limit on temperature depending upon the resulting rate of corrosion of materials of construction. Preferably, the temperature is between about 75° and about 150° C. Higher temperatures enable the contact time or column length to be shortened. Particularly in continuous systems, the relative amounts or flows of contaminated sulfuric acid and of inert gas can be within broad ranges, obtained by routine testing to achieve the desired purity, and depending upon the particular contacting apparatus, contamination levels, temperature and pressure conditions employed. Suitable apparatus for the desorber step include packed and/or tray columns connected to a blower or vacuum pump.

One important feature of the present invention is that fluosulfonic acid is added to the contaminated waste stream before it is contacted with the inert gas. Although it is recognized that the boron values in the contaminated acid may take forms such as $H_2BO_2F$ and $HBOF_2$, it is convenient to partition the boron content into a boric acid component and a boron trifluoride component. Thus each three moles of $H_2BO_2F$ ca be thought of as two moles of boric acid and one mole of boron trifluoride, while each three moles of $HBOF_2$ can be thought of as one mole of boric acid and two moles of boron trifluoride.

The boric acid moles present in the waste acid stream from a boron trifluoride manufacturing process may be estimated by assuming that all of the fluoride is in the form of boron trifluoride and that all of the boron is either in the form of boron trifluoride or in the form of boric acid. Thus the moles of boric acid will be:

$$\frac{B}{10.81} - \frac{F}{3 \times 19.00}$$

where B is the grams of boron and F is the grams of fluoride. If R is the desired molar ratio of fluosulfonic acid to boric acid sought, then the amount of fluosulfonic acid to be added becomes $$R \times 100.07 \times \frac{B}{10.81} - \frac{F}{57} = R \times (9.26B - 1.76F)$$

The above formula is independent of the units chosen so that, when B and F are identically measured in, for example, kilograms per hour, pounds per minute, parts per million or any other relevant unit, the resultant fluosulfonic acid quantity comes out in the same unit. Once this quantity is determined on an exact or estimated basis, fluosulfonic acid (or hydrogen fluoride and sulfur trioxide together) are added to the contaminated sulfuric acid in quantities sufficient to convert the boric acid component (and all intermediate forms) to boron trifluoride. Based upon the above partitioning, this stoichiometric amount will be about three moles of fluosulfonic acid (or three moles of HF) per mole of boric acid component. Thus a molar ratio of at least 3, preferably between about 3 and about 4, and more preferably about 3.5, is used.

In actual operations, the effect of the fluosulfonic level (such as the temperature change in the absorber column, the partial pressure of boron trifluoride leaving the absorber column or the boron level of the liquid leaving the desorber column) may be measured and the fluosulfonic acid level adjusted accordingly. This is normally suggested instead of estimating the boric acid content of the contaminated acid. All that is required is that fluosulfonic acid (or HF) be used in quantities sufficient to spring the non-volatile boron values.

The process of the present invention can reduce boron levels in a contaminated sulfuric acid stream such as the waste stream from a boron trifluoride manufacturing process from levels such as 0.3 to 0.5% boron and 0.3 to 1% fluoride to levels such as 0.01 to 0.05% boron and 0.02 to 0.1% fluoride, all be weight. These lower amounts represent levels at which the acid is now directly suitable for many uses. Furthermore, the contaminated sulfuric acid from a boron trifluoride process is conventionally blended with industrial or higher grades of sulfuric acid to bring the boron (especially) and fluoride levels below levels accepted for agricultural grade sulfuric acid or the like. When the contaminated sulfuric acid is purified by the present process, a much smaller ratio of industrial grade sulfuric acid to contaminated sulfuric acid can be used for this blending. For example if the contaminated sulfuric acid contains 0.3% boron then about 29 times as much industrial grade sulfuric acid must be used to bring the boron level down to the 0.01% specification set for sulfuric acid used to prepare fertilizers. If, however, the contaminated acid is purified by the present process to lower the boron concentration to 0.03%, only two parts of industrial grade sulfuric acid need be used for each part of purified contaminated sulfuric acid to achieve the 0.01% specification.

The second step of the present invention involves recovering boron trifluoride (and frequently also fluosulfonic acid) from the inert gas. Rather than hydrolyzing the boron trifluoride, the present process involves recovering the boron trifluoride in usable form in sulfuric acid preferably of a concentration of at least about 95%, more preferably at least about 98% and most preferably between about 98% and about 101%. So long as the absorbing sulfuric acid is at least about 95% "concentration" it can be used as a feed or recycle stream to a boron trifluoride manufacturing process. Strength above about 98% is preferred in order to reduce corrosion.

Since the solubility and rate of dissolving boron trifluoride from inert gas in concentrated sulfuric acid (over about 90%) by itself it quite low, the absorbing liquid contains a mixture of boric acid and sulfuric acid. With boric acid present, both the rate of absorption and capacity of the liquid for boron trifluoride increase dramatically.

The sulfuric acid "concentration" of the mixture of sulfuric acid and boric acid used to determine the above preferred numbers is not the result of titration alone. The acidity determined by titration is a measure of both boric acid (one titratable hydrogen per molecule) and sulfuric acid (two titratable hydrogens). Accordingly, to determine if a given solution has more or less than a standard "concentration", one may measure the boron and fluoride levels in the test solution, add boric acid and hydrogen fluoride to a reference sulfuric acid of the desired standard concentration (for example 95% or 98%) and measure the acidity of the two solutions by titration with the same aqueous base. If the test material requires more base than the reference, it had a sulfuric acid "concentration" as intended herein of over the standard value.

When so used, the boron trifluoride recovered from the inert gas (and any fluosulfonic acid also absorbed therefrom) can be effectively recycled back so as to increase the amount of boron trifluoride recoverable from the manufacturing process. It should be appreciated that any absorbing sulfuric acid stream may be so used to absorb boron trifluoride from the inert gas, whether or not the contaminated sulfuric acid stream was the waste stream from a boron trifluoride manufacturing process. Preferably, however, both the contaminated sulfuric acid stream which is purified by the first or desorbing step and the absorbing stream which is employed in the second step are portions of the waste acid stream of a boron trifluoride manufacturing process.

The conditions of the absorbing step are not specifically critical, with pressures of atmospheric pressure or somewhat below (down to about 700 mm of mercury or about 93 kPa) or higher being suitable. Preferred pressures are between about 1 and 5 atmospheres (about 101.3 to about 506.6 kPa). The temperature is not especially critical, with temperatures between ambient (20° C.) and 100° C. being preferred and with temperatures between about 20° C. and about 50° C. being more preferred. In general, lower temperature and higher pressures result in an increased absorption rate, while lower temperatures also tend to increase the viscosity of the absorbing mixture of sulfuric and boric acids.

The absorbing sulfuric acid may contain various impurities, but preferably contains as significant impurities only boron as boric acid or boron trifluoride and fluoride as boron trifluoride and fluosulfonic acid. When limited to these impurities and having a sulfuric acid "concentration" of at least about 95%, as determined above, the absorbing sulfuric acid stream is suitable after absorption for recycling to a boron trifluoride manufacturing process. Preferably the "concentration" is at least about 98%, more preferably between about 98% and about 101%.

Preferably the absorbing sulfuric acid stream contains boric acid at a concentration between about 5 and about 30% and more preferably between about 15 and about 25%, all by weight. These concentrations may be obtained by adding boric acid in solid form to a portion of the waste acid stream of a boron trifluoride manufacturing process. It has been found that boric acid significantly increases the rate and capacity of absorption of boron trifluoride into concentrated sulfuric acid. Concentrations below about 5% are somewhat limited in their effect upon boron trifluoride absorbing rate and are hence less preferred. Concentrations above about 25% and especially above about 30% are less preferred because of a resultant increase in the viscosity of the boric-sulfuric acid solution, reducing the ease and degree of mixing between the absorbing boric-sulfuric acid mixture and the inert gas. Normally, the temperature of the absorbing step and the boric acid content of the absorbing liquid are together limited by the workable viscosity of the absorbing apparatus chosen. In general, absorbing liquids with viscosities as high as 800 centipoise (800 mPa.s) may be used, but liquids with viscosities below 500 mPa.s are preferred and liquids with viscosities below 150 mPa.s are more preferred. Since concentrated sulfuric acid at normal absorbing conditions will have a viscosity of about 10–50 mPa.s, the preferred viscosity range for the absorbing liquid is about 40 to about 500 mPa.s and the more preferred range is about 80 to about 150 mPa.s.

Apparatus suitable for the absorbing step include a packed and/or tray absorbing tower. The relative flow rates or amounts of inert gas and absorbing sulfuric acid, depending upon the apparatus chosen, concentration of boron trifluoride in the inert gas, the composition of the absorbing sulfuric acid, the temperature and pressure, can be easily determined within broad ranges by routine testing and measurement. Preferably, contact times and other conditions are sufficient to reduce the boron level in the inert gas below about 10 ppm, more preferably below about 5 ppm and most preferably below about 1 ppm. This higher boron level represents a substantially complete boron trifluoride recovery for purposes of a system in which the inert gas is then recycled to the first step of the process. The more stringent boron trifluoride levels of 5 and 1 ppm represent levels whereat the inert gas may be vented after the absorbing step. Since maximum acceptable ambient boron levels vary depending upon the conditions and upon controlling environmental regulations and laws, the absorbing step is preferably conducted in a manner that will, at a minimum, achieve these necessary limits. Because of the potential hazards of atmospheric boron trifluoride vapors, it is generally preferred that the inert gas be recycled rather than vented. In general, the recovery of boron rather than the recovery of fluoride should be monitored. Fluoride, as boron trifluoride, is normally removed from the inert gas stream to resonable levels such as about 52, 26 and 5 ppm, respectively, whenever the above boron levels are achieved since fluosulfonic acid and hydrogen fluoride will normally be removed from the inert gas before the boron trifluoride reaches the low levels specified above.

DESCRIPTION OF THE FIGURE

The FIGURE is a schematic representation of a continuous process according to the present invention.

DETAILED DESCRIPTION OF THE PREFERRED EMBODIMENT

The by-product acid stream of a boron trifluoride process in stream 1 is partitioned at point 2 into a waste portion in stream 3 and a recycle portion in stream 4. Representative porportions are 40 to 70% waste portion and 30 to 60% recycle portion depending upon the desired ratio of boric to sulfuric acids used in the system. The maximum amount of waste acid in stream 3 is fixed by the size or capacity of the plant since, in general, about 4.33 net units by weight of sulfuric acid are produced by a boron trifluoride plant for each unit of product boron trifluoride.

The waste portion stream 3 is fed to a mixer-reactor apparatus 5. Also fed to mixer-reactor 5 is a stream 6 containing fluosulfonic acid in liquid form. Alternatively, hydrogen fluoride could be fed to mixer 5, in which case a gas-liquid mixing apparatus would be used.

The flow of fluosulfonic acid can be controlled by a valve or pump 7 responsive to some measurement elsewhere in the system as described below.

The outflow from mixer-reactor 5 containing essentially all of the boron as boron trifluoride passes in stream 8 through a heater 9 to desorber 10 which may be a packed and/or tray column.

In desorber 10, the acid is intimately contacted with a stream of inert gas such as air or nitrogen in line 11. Examples of such types of contacting are well known. Temperature may be independently controlled by a heater to achieve the desired temperature within a range of about 20°–250° C., preferably 75°–150° C. The liquid outflow from desorber 10 in stream 13 will be low in boron and fluoride levels as, for example, 0.01–0.05% boron and 0.02–0.1% fluoride and can therefor be used as a product for the purposes for which waste acid in stream 3 may have been unsuitable. The boron value level in this stream may be measured, with this measurement used to control pump or valve 7. If the boron acid level in stream 13 rises, more fluosulfonic acid should be admitted through pump or valve 7.

From partition point 2, the recycle portion in stream 4 passes to mixer 14 where boric acid (or $B_2O_3$ if available) is added as indicated by numeral 15. Outflow stream 16 is passed through a cooler to an absorber 17 where it is contacted by a $BF_3$-rich inert gas stream 18 (the gas outflow from desorber 10 which has been preferably pressurized to atmospheric pressure or above). Suitable apparatus for absorber 17 includes a packed column and/or a tray column. Substantially all of the boron trifluoride and the fluosulfonic acid in the inert gas stream is absorbed into the liquid, which may then be conducted through stream 19 back to the boron trifluoride manufacturing process; here it may be fortified with additional boric acid and introduced into the $BF_3$ generator.

An alternative monitoring system for controlling pump or valve 7 is the temperature differential along absorber 17. If this temperature changes, one may conclude that excess fluosulfonic acid (or HF) is entering absorber 17 through stream 18 and reacting with the boric acid in stream 11 to form additional boron trifluoride. If this temperature change becomes excessive, less fluosulfonic acid (or HF) should be admitted through pump or valve 7.

Another alternative monitoring system for controlling pump or valve 7 is the boron or fluoride level in stream 11 leaving absorber 17. This measurement is less preferred than the temperature change in absorber 17 or the boron content in stream 13 since boron trifluoride will normally enter stream 11 only after the absorbing capacity of absorber 17 is exceded. Under these circumstances, the fluosulfonic acid admitted by pump or valve 7 through stream 6 should be adjusted.

The gas outflow from absorber 17 is returned in stream 11 to contactor 10. Since it is not vented, this gas stream may contain some boron and fluoride levels such as up to 10 ppm boron and 60 ppm fluoride, both unacceptably high for venting to the atmosphere.

It is contemplated that partitioning at point 2 can be set so that stream 19 represents the entire flow of sulfuric acid required to carry boric acid to the manufacturing process, with additional boric acid optionally added thereto to give the desired boric acid feed to the $BF_3$ reactor. The other feed to the boron trifluoride reactor is fluosulfonic acid. This is shown schematically by optional mixer 21 in which additional boric acid or boron trioxide can be added, stream 22 in which the mixture is fed to a reactor 23 to which is also fed fluosulfonic acid. Product $BF_3$ is then purified or otherwise treated in conventional fashion in system 24, while the liquid phase is directed back through stream 1 to the purification system.

It will be appreciated that elements 21, 22, 23, 24, 1, 2, 3 and 4 all represent parts of a conventional boron trifluoride manufacturing facility as described, for example, in U.S. Pat. No. 2,416,133 to Young et al. (Feb. 18, 1947). Conventionally, the recycle portion of the by-product acid is directed from stream 4 through stream 25 back to mixer 21 where all of the boric acid is added. The remainder of the FIGURE is the portion of the overall system representing the purification and recovery process of the present invention.

The following Examples 4–10 represent simulations of removal of boron trifluoride and fluosulfonic acid from the waste portion of the by-product acid as illustrated in the FIGURE by elements 5–13. The following Examples 12, 15, 18, 19, 26 and 27 represent absorption of the boron trifluoride and fluosulfonic acid back into a sulfuric acid stream containing boric acid as illustrated in the FIGURE by elements 14–19. These Examples are illustrative and should not be read to limit the invention as set forth in the claims that follow.

COMPARATIVE EXAMPLES 1 and 2

Samples of about 350 grams spent acid were blown with dry nitrogen at 60° C. for 5¾ hours (C 1) and at 150° C. for 7 hours (C 2). An aliquot of each liquid was then analyzed for boron by titration and for fluoride with a fluoride specific electrode. On observation of the liquid after blowing, the spent acids purified in Comparative Example 2 did not visibly fume, but spent acid purified in Comparative Example 1 did fume slightly. The latter Example (C 2) was continued for a total time of 23 hours with no apparent further decline in boron level.

COMPARATIVE EXAMPLE 3

Comparative examples 1 and 2 were repeated with a different contaminated sulfuric acid stream for one hour as shown in Table 1 at 150° C. The results are displayed in Table 1.

EXAMPLE 4

Comparative Example 3 was repeated except that 2.5 g (0.025 mol) of fluosulfonic acid was added to the contaminated sulfuric acid prior to purging with nitrogen. As a result, the boron level was lowered to 0.046% instead of 0.096% and the fluoride level was lowered to 0.03% instead of 0.07%.

EXAMPLE 5

Using a metered flow of 100–125 mL/min nitrogen and 230 g of contaminated sulfuric acid contained in a 150 mL glass reactor to which 11.4 g (0.114 mol) fluosulfonic acid was added, Example 4 was repeated for 1.5 hours. The liquid reaction mixture was sampled at 0.5 hours, 1.0 hours and 1.5 hours as indicated in Table 1 by 5A, 5B and 5C. The results displayed in Table 1 indicate that the boron level dropped to about 0.028% within one half hour (probably by purging of boron trifluoride) and did not drop further, but the fluoride level continued to decline (probably by continued purging of $HSO_3F$).

EXAMPLES 6–8

To establish that boric acid was being converted to boron trifluoride by the added fluosulfonic acid, two contaminated sulfuric acid systems were made up from Reagent Grade materials as indicated in notes 9 and 10 to Table 1. As indicated in Table 1, the boron level dropped to about 0.026% regardless of the added boric acid, indicating that the boric acid was almost quantitatively converted to boron trifluoride and that the boron trifluoride was then purged down to the same minimum level. Based upon analysis for both boron and fluoride, the liquid product of these three runs were believed to contain the following components as contaminants:

| Example | Boron trifluoride | Fluosulfonic Acid | Boric Acid |
|---|---|---|---|
| 6 | 0.16% | 1.68% | — |
| 7 | 0.16 | 0.11 | — |
| 8 | 0.002 | 0.0 | 0.16% |

EXAMPLE 9

Example 5 was repeated at 120 ±5° C. using a simulated contaminated sulfuric acid as described in note 11 to Table 1. As indicated in Table 1, the boron level dropped to 0.046% after one half hour without nitrogen flow but under vacuum, then to 0.36% after a second half hour under vacuum with nitrogen flow and finally to 0.015% after a third half hour under vacuum with nitrogen flow. The fluoride level dropped at the same time to 0.041%, then to 0.016% and finally to below 0.01% (estimated to 0.003%). Apparently, boron trifluoride and hydrogen fluoride were both still coming off under these conditions.

EXAMPLE 10

Example 7 was repeated for one hour at 145–150° C. using an actual contaminated waste stream from a boron trifluoride manufacturing facility whose analysis is given in note 12 to Table 1. Liquid samples are taken at half hour intervals. The boron level apparently stabilized at about 0.02% within one half hour, but the fluoride level quickly dropped to below 0.01% (estimated at 0.002% after the first half hour and 0.002% after the second half hour).

before and after the experiment and expressing the weight gain as a weight percent of the initial acid weight. The abosorbed boron trifluoride was 0.5% and 0.8%, respectively.

EXAMPLE 12

Absorption In Sulfuric Acid with 25% Boric Acid

Comparative example 11 was repeated with a mixture of 25 parts of boric acid dissolved in 75 parts of 100% sulfuric acid and a starting temperature of 60° C. The peak temperature was 72° C. and the absorbed boron trifluoride was calculated as 25.1%, although absorption was still continuing.

EXAMPLES AND COMPARATIVE EXAMPLES 13–20

A glass column 1½ inch diameter by 12 inch length (3.81 cm by 30.5 cm) for a total volume of 320 mL was packed with 80 g (285 mL) of stainless steel packing. An inch of stainless steel wool was provided at each end and a tightly packed glass wool plug was inserted at the top (downstream end) to act as a demister. This column was then filled, in successive tests, with water, water plus surfactant, 20% sodium hydroxide plus surfactant, 100% sulfuric acid, 9.1% boric acid in 100% sulfuric

TABLE 1

| | Start | | HSO$_3$F[1] | Sulfuric Acid Purging Time | Temp | Pressure | | Final | |
|---|---|---|---|---|---|---|---|---|---|
| Ex. | B | F | (grams) | hrs. | °C. | (mm Hg) | Purge[2] | B | F |
| C1 | 0.25[3] | 0.74[3] | — | 6.0 | 60 | atm | N$_2$ | 0.097 | 0.15 |
| C2 | 0.25 | 0.74 | — | 7.0 | 150 | atm | N$_2$ | 0.085 | 0.03 |
| C3 | 0.25[4] | 0.77[4] | — | 0.5 | 150 | atm | N$_2$ | 0.096 | 0.07 |
| 4 | 0.25 | 0.77 | 2.5[5] | 0.5 | 150 | atm | N$_2$ | 0.046 | 0.03 |
| 5A | 0.29[6] | 1.14[6] | 11.4[7] | 0.5 | 145–150 | 100 | 100–125 | 0.028 | 0.06 |
| 5B | a | a | a | 1.0 | 145–150 | 100 | 100–125 | 0.027 | 0.02 |
| 5C | a | a | a | 1.5 | 145–150 | 100 | 100–125 | 0.028 | 0.002[8] |
| 6 | —[9] | —[9] | —[9] | 2.5 | 150 | atm | 125 | 0.025 | 0.45 |
| 7 | —[10] | —[10] | —[10] | 2.0 | 145–150 | atm | 100 | 0.026 | 0.34 |
| 8 | —[10] | —[10] | —[10] | 2.0 | 145–150 | 100 | 125 | 0.028 | 0.002[8] |
| 9A | 0.19[11] | 0.28[11] | 5.5[11] | 0.5 | 120 ± 5 | 100 | 0 | 0.046 | 0.041 |
| 9B | a | a | a | 1.0 | 120 ± 5 | 100 | 100 | 0.036 | 0.016 |
| 9C | a | a | a | 1.5 | 120 ± 5 | 100 | 100 | 0.015 | 0.003[8] |
| 10A | 0.53[12] | —[12] | 11.5[13] | 0.5 | 145–150 | 100 | 130 | 0.019 | 0.003 |
| 10B | a | a | a | 1.0 | 145–150 | 100 | 130 | 0.021 | 0.002[7] | a = Examples marked B and C are continuations of examples marked A and, therefore, the starting boron and fluoride levels are the final levels of the previous line
[1]Fluosulfonic acid purchased from J. T. Baker as Technical Grade. Numbers in this column represent grams. As explained in the following footnotes, these quantities were determined to establish a desired molar ratio of fluorosulfonic acid to boric acid.
[2]The purge was by a metered stream of nitrogen gas (indicated numerically in mL/min). In the examples marked "N$_2$" the nitrogen flow rate was not recorded.
[3]Assuming that all fluoride was as boron trifluoride and that boron not accounted for by boron trifluoride was as boric acid, the estimated content in the first two comparative examples was 0.89% boron trifluoride and 0.62% boric acid.
[4]On assumptions of note 3, 0.92% boron trifluoride and 0.59% boric acid.
[5]Giving a molar ratio of fluosulfonic acid to estimated boric acid of 1.47.
[6]On assumptions of note 3, 1.36% boron trifluoride and 0.42% boric acid.
[7]Measured to give a molar ratio of fluosulfonic acid to estimated boric acid of 3.5.
[8]Estimated values, fluoride detector not accurate below 0.01%
[9]Sample prepared by mixing 230 g of 100% sulfuric acid, 11 g of fluosulfonic acid and 2 g of boron trifluoride.
[10]Samples prepared by mixing 230 g of 100% sulfuric acid, 11 g of fluosulfonic acid, 2 g of boric acid and 2 g of boron trifluoride.
[11]Sample prepared by mixing 185 grams of 100% sulfuric acid, 1.1 g (0.0178 mol) of boric acid, 1.2 g of boron trifluoride and 5.5 gm (0.051 mol) of fluosulfonic acid. Molar ratio of fluosulfonic acid to boric acid of 3.08.
[12]Analysis by wet chemical method as 99.15% total acid as H$_2$SO$_4$, 1.99% H$_3$BO$_3$ and 0.89% BF$_3$. The listed boron and fluoride levels were directly measured.
[13]Based on the 1.99% boric acid value, measured to give a molar ratio of boric acid to fluosulfonic acid of 3.59.

COMPARATIVE EXAMPLE 11—ABSORPTION IN SULFURIC ACID

The solubility of gaseous BF$_3$ in 100% sulfuric acid (freezing point 10.1° C.) was determined by passing gaseous BF$_3$ into the acid at a pressure of 1 atmosphere (101 kPa) and at starting temperatures of 25° C. and 100° C. Absorption was measured by weighing the acid acid and 95% sulfuric acid. In each test a mixture of nitrogen and boron trifluoride was introduced. The column was observed and the outflow was measured for boron trifluoride by infrared spectroscopy. The results are displayed in Table 2 for examples in which no detectable boron trifluoride passed the demister.

TABLE 2

| Ex. | Liquid | Absorption of $BF_3$ | | Observations |
|---|---|---|---|---|
| | | $N_2$ Rate | $BF_3\%$ | |
| C13 | Water | 95 | 2.0 | Fog observed entering demister |
| C14 | Water + Surfactant | 95 | 2.0 | Smaller bubbles, still fog |
| 15 | 20% NaOH + Surfactant | 225 | 9.9 | Heavy fog held by demister |
| C16 | 100% Sulfuric Acid | 100 | 4.8 | No fog |
| C17 | 100% Sulfuric Acid | 205 | 1.9 | No fog |
| 18 | 9.1% Boric Acid in 100% Sulfuric Acid | 100 | 4.0 | No fog |
| 19 | 9.1% Boric Acid in 100% Sulfuric Acid | 225 | 8.9 | No fog |
| C20 | 85% Sulfuric Acid | 345 | 10.1 | No fog |

In general, 100% sulfuric acid had only a limited capacity for boron trifluoride while the various aqueous absorbing systems recovered boron trifluoride in an unusable form and caused a fog to form. Mixtures of boric and sulfonic acids had none of these problems.

EXAMPLES AND COMPARATIVE EXAMPLES 21–25

Examples 13–20 were repeated using a 2 inch diameter, 18 inch long column (5.08 cm by 45.7 cm) packed with six 3-inch sections of polypropylene column packing (sold as Koch Flexipac). The results are displayed in Table 3. No $BF_3$ was measured in the outflow in any case.

TABLE 3

| Ex. | Liquid | $N_2$ Rate | $BF_3\%$ | Observations |
|---|---|---|---|---|
| C21 | Water | 210 | 4.5 | Much fog-thick |
| C22 | Water + Surfactant | 200 | 3.8 | Less fog-still thick |
| C23 | 20% NaOH | 375 | 2.1 | Considerable fog-haze |
| 24 | 10% Boric/ 100% Sulfuric | 210 | 9.5 | Clear-No haze |
| 25 | 19% Boric/ 100% Sulfuric | 400 | 5.2 | Clear-No haze |

EXAMPLE 26

The system used in Examples 21–25 was charged with 975 mL (1780 g) of 20% boric acid in 100% sulfuric acid at room temperature (25° C.). Nitrogen was fed in at 390 mL/min (corrected at atmospheric pressure) and boron trifluoride at 52.5 mL/min (corrected to atmospheric pressure). Total nitrogen per day was thus about 561.6 L (643 g). The boron trifluoride was about 24.6 weight % of the gas stream (11.9% by volume). Detectable boron began at 23–26 hours after 200–230 g of boron trifluoride had been absorbed and rose to 87 ppm after 27¾ h (242 g of $BF_3$), to 230 ppm after 29½ h (258 g of $BF_3$) and to 316 ppm after 30½ h (266 g of $BF_3$).

EXAMPLE 27

Example 26 was repeated at 50° C. using 1 L (1835 g) of 20% boric acid in 100% sulfuric acid and a nitrogen flow rate of 400–430 mL/min and a boron trifluoride flow rate of 90–100 mL/min. Thus the gas contained about 10–11% boron trifluoride by volume (22% by weight). Boron trifluoride haze was first observed at about 11 hours, but apparently reached a 10 ppm level at about 10 hours (90 g of $BF_3$) and rose to 33 ppm at 11¾ hours (104 g of $BF_3$), 49 ppm at 12¾ hours (112 g of $BF_3$), 89 ppm at 13¾ hours (121 g of $BF_3$), 167 ppm at 15¾ hours (139 g of $BF_3$) and 205 ppm at 16¾ hours (148 g of $BF_3$).

Examples 26 and 27 illustrate the large capacity of concentrated sulfuric acid with added boric acid for boron trifluoride.

What is claimed is:

1. A process comprising:
    (a) adding fluosulfonic acid to contaminated sulfuric acid which is a first portion of the waste acid of a boron trifluoride synthesis process containing dissolved boron trifluoride and boric acid at a molar ratio of fluosulfonic acid to boric acid of at least about 3,
    (b) contacting the contaminated sulfuric acid with an inert gas to withdraw boron trifluoride into the inert gas,
    (c) contacting the inert gas with an absorbing liquid which is a second portion of the waste acid of a boron trifluoride synthesis process to which boric acid or boric oxide has been added to remove the boron trifluoride from the inert gas, and
    (d) feeding the absorbing liquid containing boron trifluoride removed from the inert gas into the boron trifluoride synthesis process.

2. The process of claim 1 where the ratio of added fluosulfonic acid to boric acid contaminant is about 3 to about 4.

3. The process of claim 3 wherein said ratio is about 3.5.

4. The process of claim 1 wherein the contaminated sulfuric acid is contacted with inert gas at a temperature between about 20° C. and about 250° C. at a pressure below about 120 kPa.

5. The process of claim 5 wherein said temperature is between about 75° C. and about 150° C. and said pressure is between about 4 and about 107 kPa.

6. The process of claim 1 wherein said absorbing liquid comprises sulfuric acid with a concentration of at least about 95% and boric acid.

7. The process of claim 6 wherein said absorbing liquid is about 5–30 weight percent boric acid.

8. The process of claim 7 wherein said absorbing liquid is about 15–25 weight percent boric acid.

9. The process of claim 1 or 6 wherein the inert gas is contacted with absorbing liquid at a temperature of between about 20° C. and about 100° C. and a pressure of between about one and about five atmospheres.

10. The process of claim 9 wherein said temperature is between about 20° C. and about 50° C.

11. The process of claim 1 or 6 wherein fluosulfonic acid is added in an amount equal to $R \times (9.26B - 1.76F)$, wherein R is at least about 3, B is the amount of boron in the contaminated sulfuric acid and F is the amount of fluoride in the contaminated sulfuric acid, with the amount of fluosulfonic acid being added, the amount of boron and the amount of fluoride being measured in an identical unit of weight.

12. The process of claim 11 wherein R is between about 3 and about 4.

* * * * *